May 18, 1937.　　　　R. S. CONDON　　　　2,080,760
VALVE
Filed June 3, 1936
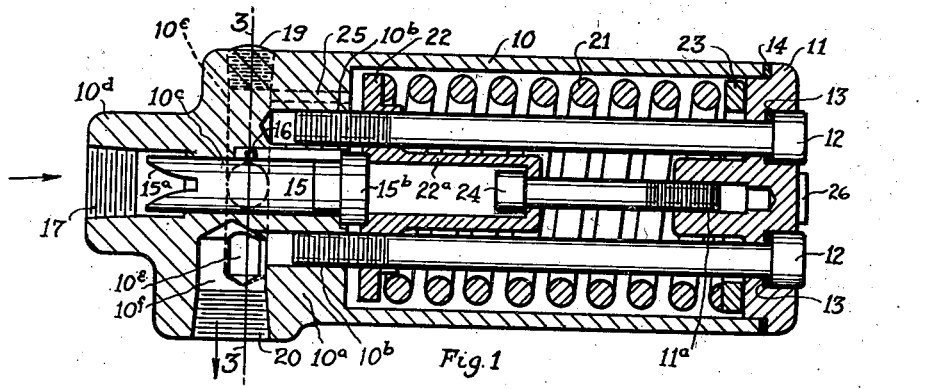
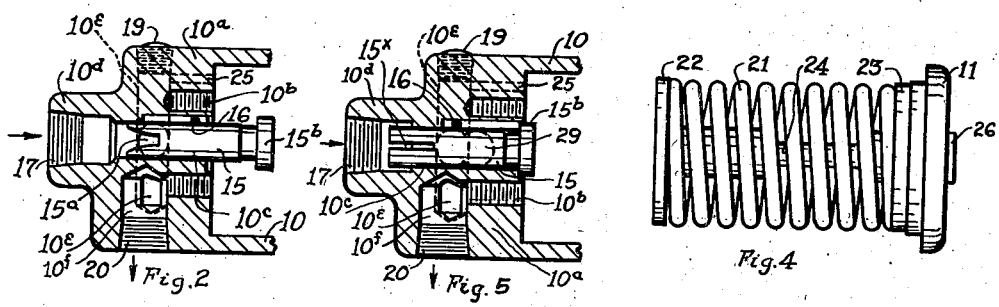
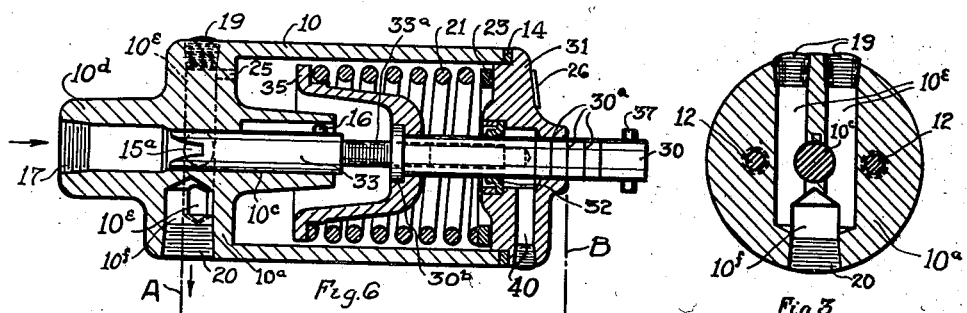
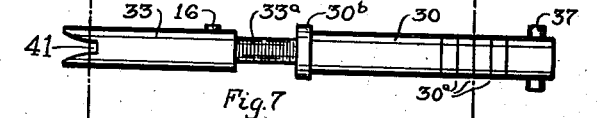
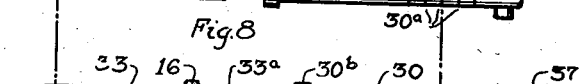
INVENTOR
Robert S. Condon Patented May 18, 1937

2,080,760

UNITED STATES PATENT OFFICE 2,080,760

VALVE

Robert S. Condon, Pekin, Ill.

Application June 3, 1936, Serial No. 83,345

18 Claims. (Cl. 137—53)

This invention relates to fluid control valves such as are used in hydraulic circuits (usually using oil as a power fluid) employed to effect motions of machine elements, and the principal object of this invention is to provide a valve unit that will perform the function of a relief valve and at the same time serve to displace the function of a pressure gage in such hydraulic circuits.

Hydraulic circuits now in general use, employ a relief valve to allow the passing of the fluid when a given pressure is reached and ordinarily use a separate pressure gage to indicate the pressure developed. In many installations it is only necessary to know the pressure which the fluid attains when by-passing through the relief valve to assure satisfactory operation of the mechanism and safety to the operator. Usually relief valves are made adjustable to give a wide variation of relief pressures, and the operator adjusts the relief pressures to a specified limit as shown by the pressure gage. Those familiar with this art will recognize the weakness of placing this adjustment in the hands of an operator who may easily set this pressure too high or too low for satisfactory operation of the mechanism, or for his own safety. In the electrical industry, the corresponding weakness is offset by the use of interchangeable fuses (which function for the safety of the electrical circuit as the relief valve does for the hydraulic circuit) having definite ratings and which are not adjustable in most industrial applications, and therefore the operator can not conveniently adjust same to jeopardize the success of the installation. Similarly, my valve is designed for hydraulic applications with a definite range of relief pressures that are only permissible for the particular installation, and this rating cannot be exceeded or altered by the operator without replacing the spring cartridge in somewhat the same manner as an electrician would replace an electrical fuse.

A further object of this invention is to provide a relief valve with a built-in interchangeable spring cartridge that will give a range of relief pressures that are permissible or desired for satisfactory operation of fluid circuits.

Another object of this invention is to provide a valve that will cause fluid such as oil to by-pass through it at a higher pressure when the oil is cold than when the oil becomes heated. This characteristic is intended for those hydraulic applications that start up sluggishly when the oil is cold due to a greater resistance to the flow of the oil and to a greater frictional resistance of moving parts at such time. By supplying oil to the mechanism with a slightly higher pressure during the "start up" period this sluggishness of operation can be compensated for. This feature is attained by using a long narrow slot in the relief piston instead of the curved V orifice. As a given volume of cold oil will force the relief piston to a position that will give a larger exhaust port than will the same volume of heated oil and thus compress the spring to a higher pressure, therefore the cold oil will be bypassed at a higher pressure than will the heated oil. The narrow slot accentuates this amount of extra piston travel required for a given change in exhaust port size required. The width of the slot or the spring characteristic can be altered to give the required rise in pressure needed to overcome the sluggishness of initial machine movements during the "start up" period.

Another object of this invention is to provide a relief valve that indicates when and at what pressure fluid is being bypassed.

A still further object of this invention is to utilize a spring that is larger in outside coil diameter than the valve piston to gain the decided advantage of a more resilient spring characteristic. Thus through the use of this more resilient spring, the relieving pressure at the time the exhaust port opens for initial bypassing can be made to differ less from the pressure attained when the orifice is opened the amount required for the available volume of discharge.

Other minor objects of the invention will be hereinafter set forth.

I will explain the invention with reference to the accompanying drawing, which illustrates several practical embodiments thereof, to enable others familiar with the art to adopt and use the same; and will summarize in the claims the essential features of the invention, the novel features of construction, and novel combinations of parts for which protection is desired.

In said drawing:

Fig. 1 is a longitudinal section through one embodiment of my valve utilizing a non-adjustable spring cartridge.

Fig. 2 is a fragmentary longitudinal section showing the piston in the position it assumes in the casing when fluid is being bypassed through the orifice.

Fig. 3 is a transverse section through the exhaust port on the line 3—3, Fig. 1, showing a convenient method of drilling to form the necessary discharge openings for the flow of fluid when the piston has been moved into bypassing position.

Fig. 4 is an elevation of the interchangeable non-adjustable spring cartridge of the type used in Fig. 1.

Fig. 5 is a fragmentary longitudinal section showing the shape of the orifice in the piston used when higher relief pressures are required while certain fluids are cold than when these fluids are heated.

Fig. 6 is a longitudinal section illustrating a modification of the valve having an adjustable spring cartridge and having a calibrated rod adjustably connected to the valve piston, and showing the piston in the position assumed when a moderate amount of fluid is being bypassed through the orifice opening, the calibrated rod being shown in position indicating a medium pressure.

Fig. 7 is an elevation of the piston and calibrated rod in their respective positions assumed in the valve shown in Fig. 6 when a low delivery of fluid is being bypassed at a medium pressure, the amount of opening of the orifice being observed by reference to the line A—A of the exhaust port, and the position of the calibrations on the rod being observed by reference to the line B—B of the end of the valve cap.

Fig. 8 is an elevation of the piston and calibrated rod in their respective positions assumed in the valve (Fig. 6) when a high delivery of fluid is being bypassed at a medium pressure.

Fig. 9 is an elevation of the piston and calibrated rod in their respective positions assumed in the valve (Fig. 6) when a medium delivery of fluid is being bypassed at a higher pressure; and Fig. 10 is an elevation of the piston and calibrated rod in their respective positions assumed in the valve (Fig. 6) when a medium delivery of fluid is being bypassed at a lower pressure.

Referring to the Figs. 1–4, 10 designates the cylindrical valve body having a closed end 10a, and 11 the valve end cap connected by screws 12 extending through the body offset from the axis thereof, said screws entering tapped bores 10b in the closed end of the body. Gaskets 13 under the heads of screws 12, and gasket 14 under the cap 11 seal the spring chamber of the valve against leakage. Within an axial bore 10c in the end 10a is a valve piston 15 which is splined as at 16 to prevent rotation, said piston having a substantially curved V-shaped orifice opening 15a in its outer end for the purpose hereinafter described, and having an enlarged head 15b on its inner end adapted to contact with the spring cartridge unit. Co-axial with bore 10c is a tubular extension 10d threaded as at 17 for connection with a pipe (not shown) introducing fluid under pressure into the valve. In Fig. 3 the discharge ports are shown, same consisting of a pair of parallel vertical bores 10e disposed transversely of the bore 10c and registering therewith, the upper ends of the bores being closed by caps 19 threaded thereinto. The lower ends of bores 10e register with a discharge port 10f tapped as at 20 for the reception of an exhaust pipe (not shown) of the system or circuit. Fluid under pressure enters inlet 10d and passes through the exhaust orifice 15a when the piston 15 is retracted as in Fig. 2 and then passes into the discharge ducts 10e and out through port 10f.

The spring cartridge, shown in Figs. 1 and 4, controls the movement of piston 15, same comprising a spring 21, plate 22, spacer 23, screw 24, identifying plate 26, and the end cap 11. The plate 22 is somewhat smaller than the chamber 10 and is provided with openings for the screws 12, the plate 22 freely sliding thereon. At the center of plate 22 is a tubular extension 22a closed at its outer end; and the screw 24 passes through the end of the extension 22a and into a tapped bore 11a in the cap 11 to connect the plate 22 to the cap. The spring 21 is of slightly smaller diameter than body 10 and is interposed between the plate 22 and cap 11, same enveloping the screws 12. If desired a spacer washer 23 may be used between the spring 21 and cap 11 to modify the characteristics of the spring. Plate 22 contacts the end 15b of piston 15.

A duct 25 through the end member 10a connects the spring chamber with the exhaust ducts 10e, allowing flow of fluid into or out of the spring chamber. The pressure in the spring chamber will never appreciably exceed the exhaust pressure. Thus gaskets 13 and 14 are required to seal against the exhaust pressure only. The identifying plate 26 is attached to end cap 11 and serves to identify both the flow characteristics as well as the relief pressure range of the particular valve.

The spring 21 is made with a relatively large coil diameter so that the variation in spring force obtained from that position of the piston that allows only a small orifice opening, to that of spring force obtained from that position of the piston that allows a full orifice opening, will be small. Thus the resulting hydraulic relief pressure range will be held between sufficiently narrow limits from the time that fluid starts to bypass to the time that the full available volume is bypassing, to make this relief valve satisfactory to many applications. This feature in my valve of bypassing fluid at only a small variation in relief pressures for a wide variation in exhaust port openings, functions also to prevent the bypassing of fluid that could be advantageously used in power circuits until a pressure is attained that is very close to the necessary relief pressures for that volume of discharge.

A small variation in spring force and resulting variation in hydraulic pressure for changes in discharge orifice openings are unavoidable with the spring placed in a non-adjustable cartridge as shown in Figs. 1 and 4. The choice of the spring is a vital factor in obtaining a sufficiently small variation in relief pressures and yet keeping the dimensions of the valve to that which is commercially acceptable. A spring made large in coil diameter will be considerably shorter in solid length, than a spring held to an outside diameter which is less than the piston diameter, when the two springs have the same load variation for an equal amount of deflection. In fact, the spring with the small outside diameter will be so long in solid length that the resulting length of the enclosing valve housing would be inconveniently long for commercial applications. Thus there is a great saving in length of the valve unit effected by making the outside diameter of the spring coil 21 larger than the diameter of the valve piston 15 when the desirable spring characteristic of a small change in pressure is desired for varying exhaust orifice openings. The gain in diameter of the valve housing resulting from the use of the spring with its larger coil diameter is not detrimental to the commercial acceptability of the valve, since the drill depth of duct 10f required for the thread tap clearance of this duct determines the radius of that portion of the valve body, and as this valve is mounted by screwing it onto the intake duct 10d, this radius can be taken as the radius of the entire body without requiring additional mounting clearance.

In Fig. 5 the orifice 15x in piston 15 is made sufficiently long to allow for an increase in the amount of piston motion, and is made relatively narrow so that a considerable end motion of the piston will be required for a given amount of change in exhaust orifice opening into ducts 10e. An increase in orifice opening will be needed for cold liquid such as oil, flowing at a given rate through the valve, over that orifice opening that will be required when the same volume is flowing after the oil has been heated. Thus, since the spring 21 is compressed more when the cold oil is flowing, the pressure at which the fluid will be bypassed will be greater. The effect of this higher pressure is intended to slightly speed up a hydraulic mechanism that operates more slowly when first started up. This sluggishness of a hydraulic mechanism during the "start up" period is due largely to the greater restriction of the flow of cold oil through its ducts and ports and to a greater mechanical friction of moving parts lubricated with colder lubricating oil at this time. When higher pressures are supplied to hydraulic mechanisms in most cases, they operate more rapidly because additional pressure is available to overcome frictional resistances. Preferably extra drilling 29 is provided for valves using this feature to allow for an extra amount of piston travel, and for realizing an extra long exhaust orifice opening. Either the width of this orifice or the spring characteristic in the spring cartridge may be changed, or both, so that the required rise in bypass pressure can be obtained when the mechanism is initially started to correct the sluggishness of the initial operating rate of the particular circuit.

Fig. 6 shows a modified construction which may be used when the small change in relief valve pressures resulting from various exhaust orifice openings encountered in the use of the valve shown in Fig. 1 are too great for a particular hydraulic circuit. This modification has the addition of an externally adjustable rod 30 slidably mounted in the end cap 31 and the packing 32. This rod is calibrated as at 30a and adjustably threaded onto the end of a modified piston valve 33. An interchangeable spring cartridge is also used which, as shown in Fig. 6, consists of the calibrated rod 30, end cap 31 with packing 32, plate 35, spacing washer 23, identifying plate 26, and cross pin 37. These parts are assembled together in a self contained unit before being mounted in the body 10. Gasket 14 under end cap 31 and gaskets under the heads of screws 12 (not shown in Fig. 6) seal the spring casing from leakage. The screws 12 are shown in Fig. 3 and hold the end cap 31 in place in the same manner as these screws hold end cap 11 in place in Fig. 1. The cartridge type of construction especially facilitates assembly of these parts because the spring itself must be compressed a considerable amount before it can be assembled into the cartridge. The spring spacer 23 serves to make small changes in spring pressure and is also used to correct small unavoidable pressure variations that are the result of small dimensional errors of the spring occasioned during its manufacture. The identifying plate 26 serves to mark the particular cartridge and to inform the operator of the pressure and displacement characteristics of this particular cartridge and valve. Duct 40 is a leak return for the purpose of conveying away any possible leakage from the packing 32 and preventing this leakage from seeping out around the calibrated rod 30. Piston 33 is splined as at 16 to prevent rotation. Spring plate 35 is prevented from rotation by the two screws 12 shown in Fig. 3 upon which it is slidably mounted. Calibrated rod 30 has an annular shoulder 30b rotatably journaled in plate 35. Rod 30 is tapped to receive the threaded end 33a of piston 33.

The minimum limit of available relief pressure is obtained when the end of piston 33 engages the end of shoulder 30b of rod 30. The maximum limit of pressure is obtained when the threaded end 33a of piston 33 is unscrewed entirely out of the tapped bore in rod 30. When the threaded end of piston 33 is entirely unthreaded from rod 30 the key pin 16 is caused to engage the inner end of its keyway, and rod 30 together with the plate 35 is caused to move endwise against the spring for a short distance, but not enough to expose any calibration on rod 30. When rod 30 is subsequently rotated to screw same onto the threaded end of piston 33 it will be under spring pressure to re-engage the threads so that the adjustable connection between piston 33 and rod 30 will be re-established.

The maximum and minimum relief valve pressure settings, outlined above, place only a particular range of pressure settings at the disposal of the operator and thus prevent him from adjusting the pressure too high or too low for satisfactory operation of the mechanism or for his own safety. A valve fitted with a spring that restricts the range of relief pressures to within narrow limits, also functions to prevent any bypassing through the valve until a pressure which is very close to the relief pressure is attained at the inlet port 10d.

The calibrations 30a on the rod 30, as this rod is moved to expose them to view, indicate the pressure at which the fluid is being bypassed. These calibrations are placed in any suitable manner and may be stamped or otherwise labeled with the proper notations. It will be noted that when the pressure on this valve is less than that which is required to cause endwise motion on this rod 30, that rotational adjustment of this rod will not move it endwise enough to expose any calibrations. Thus a visual indication of the setting of this valve can only be made while the fluid is being bypassed. Accurate setting of the relief pressure is made while the bypassing of that volume of fluid is taking place for which the particular setting is desired. Any setting within the range of this valve, that is, within the range of the calibrations of this rod can be made at this time. The range of settings is determined by the range of spring forces developed by the spring for any particular spring cartridge, and to alter this range of available settings, the cartridge must be removed and either undergo alteration of the spring 21 or spring spacer 23 or else be replaced by another interchangeable spring cartridge having the desired range of pressure settings.

An allowance for the possible rates of flow, as well as an allowance for the possible differences in viscosity and other characteristics of the fluid, will require a wide range of exhaust orifice openings. In Fig. 6 this orifice opening at 15a is shown approximately half open and it is considered that a medium amount of fluid would pass through this opening with the piston 33 in the position shown. The adjustments built into this valve permit adjusting the relief pressure to the full range of pressures as indicated by the calibrations on the rod 30 for any particular exhaust orifice opening from the smallest opening 41 (Fig. 7) to the largest opening 42 (Fig. 8). The operator can readily make these adjustments by rotating rod 30, but the operator can only adjust to the limits of the particular spring cartridge used.

Fig. 7 shows piston 33 and calibrated rod 30 in their respective positions that they would assume in Fig. 6, when a small volume of flow is taking place at a medium pressure. Orifice 41 is nearly closed and rod 30 is half way out as noted by referring to the reference lines A—A and B—B drawn from Fig. 6. Fig. 8 shows orifice 42 opened to a full opening and yet the relief pressure is the same as in the above Fig. 6. Also Figs. 9 and 10 show the exhaust orifice open to permit a medium flow but in Fig. 9 the relief pressure is set at a high value and in Fig. 10 the relief pressure is set at a low value. Thus Figs. 6, 7, 8, 9, and 10 show five of the possible positions the piston 33 and calibrated rod 30 could take in the assembly shown in Fig. 6, and these positions are indicative that a full range of relief pressures that are built into the spring cartridge for this valve are available for any size of exhaust port opening that can be gained by the full range of positions of the piston. It will be noted that calibrated rod 30 indicates when and at what pressure fluid is being bypassed by this valve.

While several particular embodiments of the invention have been described, its application is intended to cover any variations, uses, or adaptations including such departures from the present disclosure as come within known or customary practice in the hydraulic art, and as may be applied to the essential features hereinbefore set forth and as fall within the scope of the invention or the limits of the applied claims.

I claim:

1. In a valve for controlling the relief pressure of fluid in a fluid circuit, a casing having a spring chamber and having inlet and exhaust ports adapted to be connected in the circuit; a slidable valve in the casing between the ports adapted to be operated by fluid pressure at the inlet port and extending into the spring chamber, and a removable self-contained spring cartridge including a spring of predetermined characteristics in the spring chamber opposing movement of the valve, said spring cartridge comprising a fixed plate; a movable plate slidably mounted on the fixed plate and adapted to enter the spring chamber and abut against the valve; and said spring being of relatively large diameter and interposed between the movable and fixed plates; and means for removably securing the cartridge within the spring chamber.

2. In a valve for controlling the relief pressure of fluid in a fluid circuit, a casing having a spring chamber and having inlet and exhaust ports adapted to be connected in the circuit; a slidable valve in the casing between the ports adapted to be operated by fluid pressure at the inlet port and extending into the spring chamber, and a removable self-contained spring cartridge including a spring of predetermined characteristics in the spring chamber opposing movement of the valve, said spring chamber being open at one end; and said spring cartridge comprising an end plate adapted to close the open end of the spring chamber; a movable plate slidably mounted on the end plate and adapted to enter the spring chamber and abut against the valve; and said spring being of relatively large diameter and interposed between the movable and end plates; and means for removably securing the cartridge within the spring chamber.

3. A valve for controlling the relief pressure of fluid in a fluid circuit, comprising a casing having a spring chamber and having inlet and exhaust ports adapted to be connected in the circuit; a slidable valve in the casing between the ports adapted to be operated by the fluid pressure at the inlet port and extending into the spring chamber; said valve having a notch in its end adjacent the inlet port forming an exhaust port orifice; a removable spring cartridge including a spring of predetermined characteristics in the spring chamber opposing movement of the valve; and means for externally adjusting the relief pressures within the available range of the spring characteristics irrespective of the amount of fluid flowing through the valve.

4. In a valve as set forth in claim 3, means for equalizing pressures in the spring chamber and exhaust port.

5. In a valve as set forth in claim 3, said spring being of larger diameter than the valve to provide maximum resiliency and to cause delay in movement of the valve until a pressure approximately that of the maximum relief pressure is obtained at the inlet port.

6. In a valve as set forth in claim 3, said spring cartridge including a movable member cooperating with the spring for altering the spring tension and the magnitude of the relief pressures.

7. In a valve as set forth in claim 3, said notch being of substantially curved V-shape.

8. In a valve as set forth in claim 3, said notch being relatively long and narrow whereby the piston must move a relatively great amount for a given orifice area change to increase the relief pressure for cold fluid as compared with the relief pressure obtained from the same flow of heated fluid.

9. In a valve as set forth in claim 3, said spring cartridge comprising a fixed plate; a movable plate slidably mounted on the fixed plate and adapted to enter the spring chamber and abut against the valve; and said spring being of relatively large diameter and interposed between the movable and fixed plates; and means for removably securing the cartridge within the spring chamber.

10. In a valve as set forth in claim 3, said spring chamber being open at one end, and said spring cartridge comprising an end plate adapted to close the open end of the spring chamber; a movable plate slidably mounted on the end plate and adapted to enter the spring chamber and abut against the valve; and said spring being of relatively large diameter and interposed between the movable and end plates; and means for removably securing the cartridge within the spring chamber.

11. In a valve as set forth in claim 3, said valve being non-rotatable; and said adjusting means comprising a rotatable rod carried by the spring cartridge and adapted to move endwise as the spring is compressed; said rod extending through the cartridge, and having a threaded engagement with the valve, whereby rotation of the rod will adjust the valve with respect to the exhaust port to vary the exhaust orifice area for any given relief pressure.

12. In a valve as set forth in claim 3, said valve being non-rotatable; and said adjusting means comprising a rotatable rod carried by the spring cartridge and adapted to move endwise as the spring is compressed; said rod extending through the cartridge and having a threaded engagement with the valve, whereby rotation of the rod will adjust the valve with respect to the exhaust port to vary the exhaust orifice area for a given relief pressure; the extending portion of said rod being calibrated whereby endwise movement thereof will indicate the relief pressure at which flow of fluid takes place.

13. A valve for controlling the relief pressure of fluid in a fluid circuit, comprising a casing having a spring chamber and having inlet and exhaust ports adapted to be connected in the circuit; a slidable valve in the casing between the ports adapted to be operated by the pressure of fluid at the inlet port and extending into the spring chamber; said valve having a notch in its end adjacent the inlet port forming an exhaust port orifice; a removable spring cartridge including a spring of predetermined characteristics in the spring chamber opposing movement of the valve; means for externally adjusting the relief pressures within the available range of the spring characteristics irrespective of the amount of fluid flow through the valve; and means for visually indicating at what pressure flow of fluid takes place in the valve.

14. In a valve as set forth in claim 13, said valve being non-rotatable; and said adjusting means comprising a rotatable rod carried by the spring cartridge and adapted to move endwise as the spring is compressed; said rod extending through the cartridge and having a threaded engagement with the valve, whereby rotation of the rod will adjust the valve with respect to the exhaust port to vary the exhaust orifice area for a given relief pressure; and said visually indicating means comprising calibrations on the extended portion of said rod whereby endwise movement thereof will indicate the relief pressure at which flow of fluid takes place.

15. In a valve for controlling relief pressures in a fluid circuit, a casing having inlet and exhaust ports adapted to be connected in the circuit; a slidable valve in the casing between the ports adapted to be operated by fluid pressure at the inlet port; said valve having a notch in its end adjacent the inlet port forming an exhaust port orifice; spring means opposing movement of the valve; said exhaust ports comprising a pair of parallel bores entering the casing transversely of the valve and disposed on opposite sides thereof, said bores each communicating with an opposite end of the notch when the valve is opened.

16. In a valve for controlling relief pressures in a fluid circuit, a casing having inlet and exhaust ports adapted to be connected in the circuit; a slidable valve in the casing between the ports adapted to be operated by fluid pressure at the inlet port; spring means opposing movement of the valve; said exhaust ports comprising a pair of parallel bores entering one side of the casing transversely of the valve and disposed on opposite sides thereof, said bores communicating with the inlet portion when the valve is opened; the lower ends of the bores communicating with a single outlet; and members closing the open ends of the pair of bores.

17. In a valve for controlling the relief pressure of fluid in a fluid circuit, a casing having a spring chamber and having inlet and exhaust ports adapted to be connected in the circuit; a slidable valve in the casing between the ports adapted to be operated by fluid pressure at the inlet port and extending into the spring chamber, and a removable self-contained spring cartridge including a spring of predetermined characteristics in the spring chamber opposing movement of the valve, and members extending through the cartridge within the coils of the spring and entering the casing, for securing the cartridge in position in the casing.

18. In a valve for controlling the relief pressure of fluid in a fluid circuit, a casing having a spring chamber and having inlet and exhaust ports adapted to be connected in the circuit; a slidable valve in the casing between the ports adapted to be operated by fluid pressure at the inlet port and extending into the spring chamber, and a removable self-contained spring cartridge including a spring of predetermined characteristics in the spring chamber opposing movement of the valve, said spring chamber being open at one end; and said spring cartridge comprising an end plate adapted to close the open end of the spring chamber; a movable plate slidably mounted on the end plate and adapted to enter the spring chamber and abut against the valve; and said spring being of relatively large diameter and interposed between the movable and end plates; and members extending through the end and movable plates within the coils of the spring and entering the casing for securing the cartridge in position in the casing.

ROBERT S. CONDON.